US011842324B2

(12) United States Patent
Mao et al.

(10) Patent No.: US 11,842,324 B2
(45) Date of Patent: Dec. 12, 2023

(54) METHOD FOR EXTRACTING DAM EMERGENCY EVENT BASED ON DUAL ATTENTION MECHANISM

(71) Applicants: HOHAI UNIVERSITY, Nanjing (CN); HUANENG LANCANG RIVER HYDROPOWER INC., Kunming (CN); HUANENG GROUP TECH INNOVATION CENTER CO., LTD., Beijing (CN)

(72) Inventors: Yingchi Mao, Nanjing (CN); Wei Sun, Kunming (CN); Haibin Xiao, Kunming (CN); Fudong Chi, Kunming (CN); Hao Chen, Kunming (CN); Weiyong Zhan, Kunming (CN); Fugang Zhao, Kunming (CN); Han Fang, Kunming (CN); Xiaofeng Zhou, Nanjing (CN); Chunrui Zhang, Kunming (CN); Bin Tan, Kunming (CN); Wenming Xie, Kunming (CN); Bingbing Nie, Kunming (CN); Zhixiang Chen, Kunming (CN); Chunrui Yang, Kunming (CN)

(73) Assignees: HOHAI UNIVERSITY, Nanjing (CN); HUANENG LANCANG RIVER HYDROPOWER INC., Kunming (CN); HUANENG GROUP TECH INNOVATION CENTER CO., LTD., Beijing (CN)

( * ) Notice: Subject to any disclaimer, the term of this patent is extended or adjusted under 35 U.S.C. 154(b) by 0 days.

(21) Appl. No.: 17/965,814

(22) Filed: Oct. 14, 2022

(65) Prior Publication Data
US 2023/0119211 A1 Apr. 20, 2023

(30) Foreign Application Priority Data

Oct. 15, 2021 (CN) .......................... 202111202116.X

(51) Int. Cl.
G06Q 10/20 (2023.01)
G06N 3/08 (2023.01)
G06Q 50/06 (2012.01)

(52) U.S. Cl.
CPC ............... *G06Q 10/20* (2013.01); *G06N 3/08* (2013.01); *G06Q 50/06* (2013.01)

(58) Field of Classification Search
CPC ........... G06Q 10/20; G06Q 50/06; G06N 3/08
See application file for complete search history.

(56) References Cited

U.S. PATENT DOCUMENTS 8,725,732 B1 * 5/2014 Jeh .......................... G06F 16/353
707/750
2009/0313243 A1 12/2009 Buitelaar et al.
(Continued)

FOREIGN PATENT DOCUMENTS

CN 111680159 A 9/2020
CN 113312500 A 8/2021

*Primary Examiner* — Sarah M Monfeldt
*Assistant Examiner* — Andrew Chase Lakhani
(74) *Attorney, Agent, or Firm* — Bayramoglu Law Offices LLC

(57) ABSTRACT

A method for extracting a dam emergency event based on a dual attention mechanism is provided. The method includes: performing data preprocessing, building a dependency graph, building a dual attention network, and filling a document-level argument. The performing data preprocessing includes labeling a dam emergency corpus and encoding sentences. Building a dependency graph includes assisting a model to mine a syntactic relation based on a dependency. Building a dual attention network includes weighing and fusing an attention network based on a graph transformer network (GTN) and capturing key semantic information in the sentence. Filling a document-level argument includes filling a document-level argument by detecting a key sentence and ordering a semantic similarity. The method intro- (Continued)

duces a dependency and overcomes the long-range dependency problem based on the dual attention mechanism, thus achieving high identification accuracy and reducing a lot of labor costs.

18 Claims, 3 Drawing Sheets

(56) References Cited

U.S. PATENT DOCUMENTS

| | | | | |
|---|---|---|---|---|
| 2017/0337474 | A1* | 11/2017 | Li | G06F 40/35 |
| 2018/0336183 | A1* | 11/2018 | Lee | G06N 5/022 |
| 2020/0089652 | A1* | 3/2020 | Jayaraman | G06N 20/00 |
| 2021/0089765 | A1* | 3/2021 | Ling | G06F 16/35 |
| 2021/0390261 | A1* | 12/2021 | Jiang | G06F 40/30 |
| 2022/0405524 | A1* | 12/2022 | Yuan | G06N 3/08 |

\* cited by examiner

METHOD FOR EXTRACTING DAM EMERGENCY EVENT BASED ON DUAL ATTENTION MECHANISM

CROSS REFERENCE TO THE RELATED APPLICATIONS

This application is based upon and claims priority to Chinese Patent Application No. 202111202116.X, filed on Oct. 15, 2021, the entire contents of which are incorporated herein by reference.

TECHNICAL FIELD

The present disclosure relates to a method for extracting a dam emergency event based on a dual attention mechanism and belongs to the technical field of natural language processing (NLP).

BACKGROUND

In the field of water conservation engineering, dams that integrate flood control, water storage, power generation, and other functions will encounter many natural risks during long-term operations, such as earthquakes, floods, and rainstorms. After these natural hazards, comprehensive special inspections are required, which are an important measure for dam maintenance. In addition, daily inspection and maintenance are also important measures to ensure the safety of the dam. Over the years, the safety operation records of the dam in the emergency working state have produced numerous lengthy special inspection reports and daily inspection reports. Mining useful information from massive unstructured text data is still a difficult problem. In this context, information extraction research came into being. Event extraction is one of the most challenging tasks in information extraction research. In the information age, relying solely on manual labor to identify and organize event arguments into structured data is time-consuming and labor-intensive. Therefore, the automatic extraction of dam emergency events is of great importance.

In the study of event extraction, it is found that existing deep learning networks (DLNs), such as convolutional neural networks (CNNs) and recurrent neural networks (RNNs), are used to generate low-dimensional vectors to automatically represent textual semantic information and further extract event arguments based on semantic vectors. Although DLNs can automatically learn low-level features, they do not fully utilize the syntactic relations and are prone to missing argument roles because event information is often scattered across multiple sentences of a document.

SUMMARY

The objective of the Present Disclosure: To overcome the problems existing in the prior art, the present disclosure introduces a dependency and proposes a method for extracting a dam emergency event based on a dual attention mechanism. The present disclosure stores and represents the information in the special inspection report and daily inspection report of a dam in a structured form for users to query and researchers to analyze. The present disclosure greatly improves the efficiency of mining important information from unstructured information.

Technical Solutions: A method for extracting a dam emergency event based on a dual attention mechanism, which can mine a syntactic relation based on a graph transformer attention network (GTAN) and an attention network, and extract and fill an event argument role based on a dam emergency corpus, includes the following steps:

(1) performing data preprocessing: labeling the dam emergency corpus and encoding sentences and a document with information on a dam emergency event;

(2) building a dependency graph: introducing a dependency and building a dependency graph based on a sentence structure and a semantic structure to identify and classify all parameters of the dam emergency event;

(3) building the dual attention network: generating a new dependency arc based on the GTAN, and aggregating node information to capture a long-range dependency and a potential interaction; and introducing the attention network, fusing features extracted by a GTAN layer and an attention network layer according to a set ratio, capturing key semantic information in the sentence, and extracting a sentence-level event argument; and (4) filling a document-level argument: detecting a sentence with a key event in the dam emergency document and filling in an argument role with the highest similarity in a surrounding sentence to a key event missing part through a twin neural network, thereby achieving extraction of the dam emergency event.

Further, a dam emergency refers to a working state of a dam in case of a natural disaster.

Further, the dam emergency corpus includes special inspection reports and daily inspection reports of a dam over the years.

Further, in step (1), the performing data preprocessing specifically includes labeling data of a special inspection report and a daily inspection report of a dam in a blocking I/O (BIO) mode, taking a 312-dimensional vector of the last layer of an ALBERT model as a word embedding vector, and concatenating an event type embedding vector, an entity type embedding vector, and a part-of-speech tag embedding vector; mining the concatenated embedding vectors through a bidirectional long short-term memory (BiLSTM) network to acquire hidden vectors $H=h_1, \ldots, h_n$. The event type embedding vector is a mathematical vector corresponding to typical events, such as earthquakes, heavy rain, flood discharge, pre-flood safety inspection, comprehensive special inspection, daily maintenance, and daily inspection. The entity type embedding vector is a mathematical vector corresponding to a person's name, organization, location, time, date, numerical value, percentage, etc. The part-of-speech tag embedding vector is a mathematical vector corresponding to a noun, verb, adjective, quantifier, pronoun, etc.

Further, in step (2), building a dependency graph specifically includes: building an adjacency matrix $A^d$ of a dependency tree and a dependency label score matrix $\tilde{A}^{dl}$ according to a word relation in the dam emergency corpus; calculating a score between the hidden vectors $h_i$ and $h_j$ acquired in step (1) to acquire a semantic score matrix $A^s$; and concatenating $A^d$, $\tilde{A}^{dl}$ and $A^s$ to acquire a dependency graph matrix $A=[A^d, \tilde{A}^{dl}, A^s]$.

Further, in step (3), the building the dual attention network specifically includes: proposing the GTAN, replacing a graph convolutional network (GCN) by a graph attention network (GAN), and performing a reasonable weight distribution, where the GTAN is an improvement of a graph transformer network (GTN), and the GCN in the GTN is replaced by the GAN (it is reasonable to give a higher weight to a trigger and an arc of a key argument in the dependency, which can give full play to an effect of the dependency); performing, by the GTAN, a 1×1 convolution to an adjacency matrix A set through a graph transformer layer, and generating a new meta-path graph $A^l$ (a new dependency arc) through a matrix multiplication; applying, by a graph attention layer, the GAN to each channel of the meta-path graph $A^l$, and concatenating multiple node representations as a Z vector; calculating a weight matrix $\alpha_a$ of the attention network layer, multiplying $\alpha_a$ point by a hidden vector H to generate a vector $\tilde{H}$, and connecting, by a hyperparameter $\lambda$, the Z vector generated by the GTAN layer and the $\tilde{H}$ vector generated by the attention network layer to acquire a fused vector W:

$$\tilde{W} = \sigma(\lambda \cdot Z + (1-\lambda) \cdot \tilde{H})$$

where $\sigma$ is a sigmoid function. Finally, the event extraction is carried out using sequence labeling, and the feature fused vector $\tilde{H}$ is mined by a conditional random field (CRF) to predict a label of each character. The problem of unbalanced samples caused by redundant useless information O is solved by a Focal loss function and an Adam optimizer.

Further, in step (4), the filling a document-level argument specifically includes: concatenating four embedding vectors of a special inspection report and a daily inspection report of a dam, namely, argument label, entity type, sentence information, and document information; building a text convolutional neural network (textCNN), taking the concatenated vectors as an input vector, detecting a key sentence regarding an event, and determining a key event; and calculating, by the twin neural network based on a Manhattan LSTM network, a semantic similarity between sentences, and filling the argument role.

A system for extracting a dam emergency event based on a dual attention mechanism includes:
  (1) a data preprocessing module configured for labeling a dam emergency corpus and encoding sentences and a document with information on a dam emergency event;
  (2) a dependency graph building module configured for introducing a dependency and building a dependency graph based on a sentence structure and a semantic structure to identify and classify all parameters of the dam emergency event;
  (3) a dual attention network building module configured for generating a new dependency arc based on a GTAN, and aggregating node information to capture a long-range dependency and a potential interaction; and introducing an attention network, fusing features extracted by a GTAN layer and an attention network layer according to a set ratio, capturing key semantic information in the sentence, and extracting a sentence-level event argument, and
  (4) a document-level argument filling module configured for detecting a sentence with a key event in the dam emergency document and filling in an argument role with the highest similarity in a surrounding sentence to a key event missing part through a twin neural network.

The specific implementation of the system is the same as that of the method.

A computer device includes a memory, a processor, and a computer program stored in the memory and executable on the processor, where the processor executes the computer program to implement the method for extracting a dam emergency event based on a dual attention mechanism.

A computer-readable storage medium stores a computer program for implementing the method for extracting a dam emergency event based on a dual attention mechanism.

Beneficial Effects: Compared with the prior art, the present disclosure has the following advantages. The present disclosure extracts a useful event from unstructured information, such as the special inspection report and daily inspection report of the dam, and presents the useful event in a structured form. This improves the ability to retrieve information and saves labor costs. The present disclosure extracts features from text data of a dam emergency, builds the word embedding vector, and captures important contextual information through the BiLSTM network, thereby improving the model prediction capability. The present disclosure generates the new dependency arc through the GTAN, aggregates the node information, captures the long-range dependency and potential interaction, weighs and fuses the attention network, captures the key semantic information in the sentence, and extracts the sentence-level event argument. This improves the performance of event argument role extraction. The present disclosure incorporates event type information and identifies the argument in the sentence with multiple events by event type, which solves the problems of overlapping roles and missing arguments and improves the accuracy of argument classification.

DETAILED DESCRIPTION OF THE EMBODIMENTS

The present disclosure will be further explained in conjunction with the specific embodiments. It should be understood that these embodiments are intended to illustrate the present disclosure rather than limit the scope of the present disclosure. Various equivalent modifications to the present disclosure made by those skilled in the art after reading the specification should fall within the scope defined by the appended claims.

Figure 1:
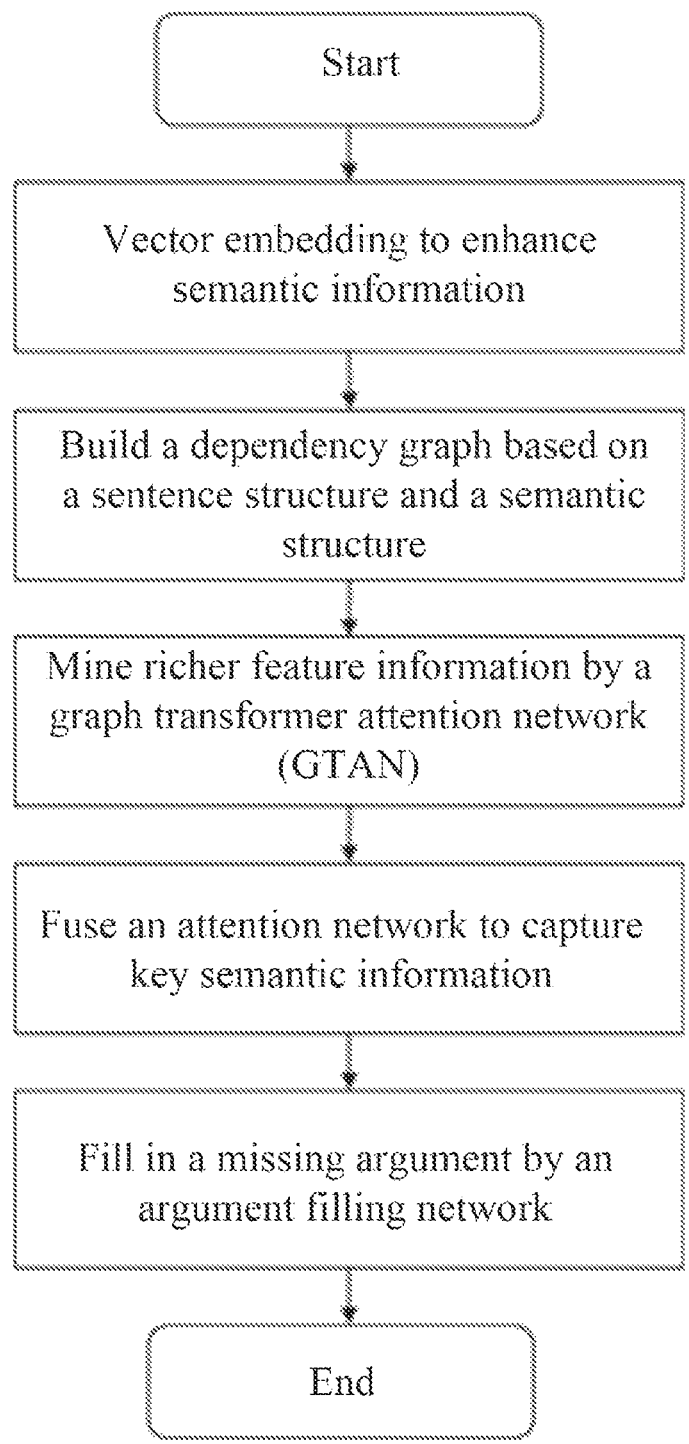
FIG. 1 is a flowchart of a method according to an embodiment of the present disclosure.

As shown in FIG. 1, a method for extracting a dam emergency event based on a dual attention mechanism specifically includes the following steps:

(1) Data preprocessing is performed: A dam emergency corpus is labeled, and sentences and a document with information on a dam emergency event are encoded based on four embedding vectors.

(1.1) The data of a special inspection report and a daily inspection report of a dam in a BIO mode are labeled, that is, each element is labeled as B-X, I-X or O. B-X denotes a beginning part of a key argument belonging to a type X, I-X denotes an intermediate part of the key argument belonging to the type X, and O denotes other words in the sentence except the key argument.

For example, the Chinese sentence "On Aug. 13, 2018, an M5.0 earthquake occurred in Tonghai County, Yuxi City, Yunnan, with a focal depth of 7 kilometers, and the straight-line distance from the epicenter of the earthquake to the dam of the Manwan Hydropower Station is about 231 kilometers." is labeled in the BIO mode as follows: OnO AugustB-Time 13I-Time,O 2I-Time0I-Time1I-Time8I-Time,O anO MB-Magnitude5I-Magnitude.I-Magnitude0I-Magnitude earthquakeO occurredO inO TongB-PlacehaiI-Place CountyI-Place,O YuI-PlacexiI-Place CityI-Place,O YunI-PlacenanI-Place,O withO aO focalO depthO ofO 7B-Depth kilometersI-Depth,O andO theO straight-lineO distanceO fromO theO epicenterO ofO theO earthquakeO toO theO damB-Place ofI-Place theI-Place ManI-PlacewanI-Place HydropowerI-Place StationI-Place isO aboutO 231B-Range kilometersI-Range.O (1.2) A sentence is given a length of n, that is, $W=w_1, w_2, \ldots, w_n$.

(1.3) A 312-dimensional vector of the last layer of an ALBERT model is taken as a word embedding vector, where an event type embedding vector, an entity type embedding vector, and a part-of-speech tag embedding vector are generated through a trainable lookup table.

(1.4) The word embedding vector, the event type embedding vector, the entity type embedding vector, and the part-of-speech tag embedding vector are concatenated. The concatenated embedding vectors are mined through BiLSTM to capture important contextual information. A sequence of hidden vectors $H=h_1, \ldots, h_h$ for representation is acquired at the next step.

(2) A dependency graph is built: A dependency is introduced, and a dependency graph is built based on a sentence structure and a semantic structure to identify and classify all parameters of the dam emergency event.

(2.1) An adjacency matrix $A^d$ of a dependency tree is taken as one of the syntactic structures of event extraction, where $A^d$ is a binary matrix of N×N. If the words $w_i$ and $w_j$ are linked in the dependency tree, $A^d(i,j)$ has a value of 1. If not, it has a value of 0.

(2.2) A matrix $A^{dl}$ is initialized according to a dependency label. A P-dimensional embedding vector of r is found from a trainable embedding lookup table by $A^{dl}(i,j)$. If there is a dependency edge between the words $w_i$ and $w_j$, the dependency label is r. Otherwise, $A^{dl}(i,j)$ is initialized by a P-dimensional all-zero vector.

(2.3) The dependency label matrix $A^{dl}$ is transformed to a dependency label score matrix $\tilde{A}^{dl}$:

$$\tilde{A}^{dl}(i, j) = \exp\left(UA^{dl}(i, j)\right) / \sum_{v=1 \ldots N} \exp\left(UA^{dl}(i, v)\right)$$

where U is a trainable weight matrix.

(2.4) A score between the hidden vectors $h_i$ and $h_j$ is calculated to acquire a semantic score matrix $A^s$:

$$k_i=U_k h_i, q_i=U_q h_i,$$

$$A^S(i, j) = \exp(k_i q_j) / \sum_{v=1 \ldots N} \exp(k_i q_v)$$

where $U_k$ and $U_q$ are trainable weight matrices.

(2.5) A dependency graph matrix $A=[A^d, \tilde{A}^{dl}, A^s]$ is acquired, where $A^d$ is the adjacency matrix of the dependency tree, $\tilde{A}^{dl}$ is the dependency label score matrix, and $A^s$ is the semantic score matrix.

(3) The dual attention network is built: A new dependency arc is generated based on the GTAN, and node information is aggregated to capture a long-range dependency and a potential interaction. The attention network is introduced. Features extracted by a GTAN layer and an attention network layer are fused according to a set ratio. Key semantic information in the sentence is captured, and a sentence-level event argument is extracted.

(3.1) The GTAN is proposed, a graph convolutional network (GCN) is replaced by a graph attention network (GAN), and a reasonable weight distribution is performed. The vector generated by the attention layer goes through a Dropout layer to prevent the model from overfitting. The GTAN is an improvement of a graph transformer network (GTN), and the GCN in the GTN is replaced by the GAN. It is reasonable to give a higher weight to a trigger and an arc of a key argument in the dependency, which can give full play to the effect of the dependency.

(3.2) The GTAN is formed by two parts: A graph transformer layer and a graph attention layer. A 1×1 convolution is applied on the adjacency matrix A set by the graph transformer layer. Two intermediate adjacency matrices $Q_1$ and $Q_2$ in the matrix vector are softly selected after the 1×1 convolution, and the matrices $Q_1$ and $Q_2$ are multiplied to generate a new meta-path graph $A^l$.

(3.3) A graph attention network (GAN) is applied to each channel of the meta-path graph $A^l$ by the graph attention layer, and multiple node representations are concatenated as Z:

$$Z = \big\Vert_{i=1}^{C} \sigma\left(\tilde{D}_i^{-1} \tilde{A}_i^{(l)} XV\right)$$

where $\|$ is a join operator, C is a number of channels, $\tilde{A}_i^{(l)}$ ($\tilde{A}_i^{(l)}=A_i^{(l)}+I$) is the adjacency matrix of an i-th channel of $A^l$, $\tilde{D}_i$ is a degree matrix of $\tilde{A}_i^{(l)}$, V is a trainable weight matrix shared across channels, X is a feature matrix, and I is an identity matrix.

(3.4) A weight matrix $\alpha_a^k$ of the attention network layer is calculated according to the following formula:

$$\alpha_a^k=\text{softmax}(\tan h(W_a^T h_k+b_k))$$

where $h_k$ is a k-th vector in the hidden vector H generated through BiLSTM, $W_a$ is a trainable weight matrix, and $b_k$ is a bias.

(3.5) A $\alpha_a$ point of the weight matrix of the attention network layer is multiplied by a hidden vector H to generate a vector $\tilde{H}$, and the Z vector generated by the GTAN layer and the $\tilde{H}$ vector generated by the attention network layer are connected by a hyperparameter λ to acquire a fused vector $\tilde{W}$:

$$\tilde{W}=\sigma(\lambda \cdot Z+(1-\lambda)\cdot \tilde{H})$$

where σ is a sigmoid function.

(3.6) The feature fused vector $\tilde{W}$ is fined by a conditional random field (CRF) to predict a label of each character.

(4) A document-level argument is filled: A sentence with a key event in the dam emergency document is detected, and an argument role with the highest similarity is filled in a surrounding sentence to a key event missing part through a twin neural network.

(4.1) An initial vector of the event argument label is set in the form of a one-hot label to be formed by 1 and 0, 1 denoting a key argument position and 0 denoting other positions. A randomly generated initial vector is trained into a 128-dimensional embedding vector by Word2vec.

(4.2) An entity type is generated by looking up a randomly initialized embedding table, and the embedding vector is set to be 128-dimensional.

(4.3) The sentence information and document information are transformed into 312-dimensional embedding vectors respectively through ALBERT.

(4.4) The four embedding vectors (i.e., argument label, entity type, sentence information, and document information) are concatenated to generate an 880-dimensional new vector.

Figure 2:
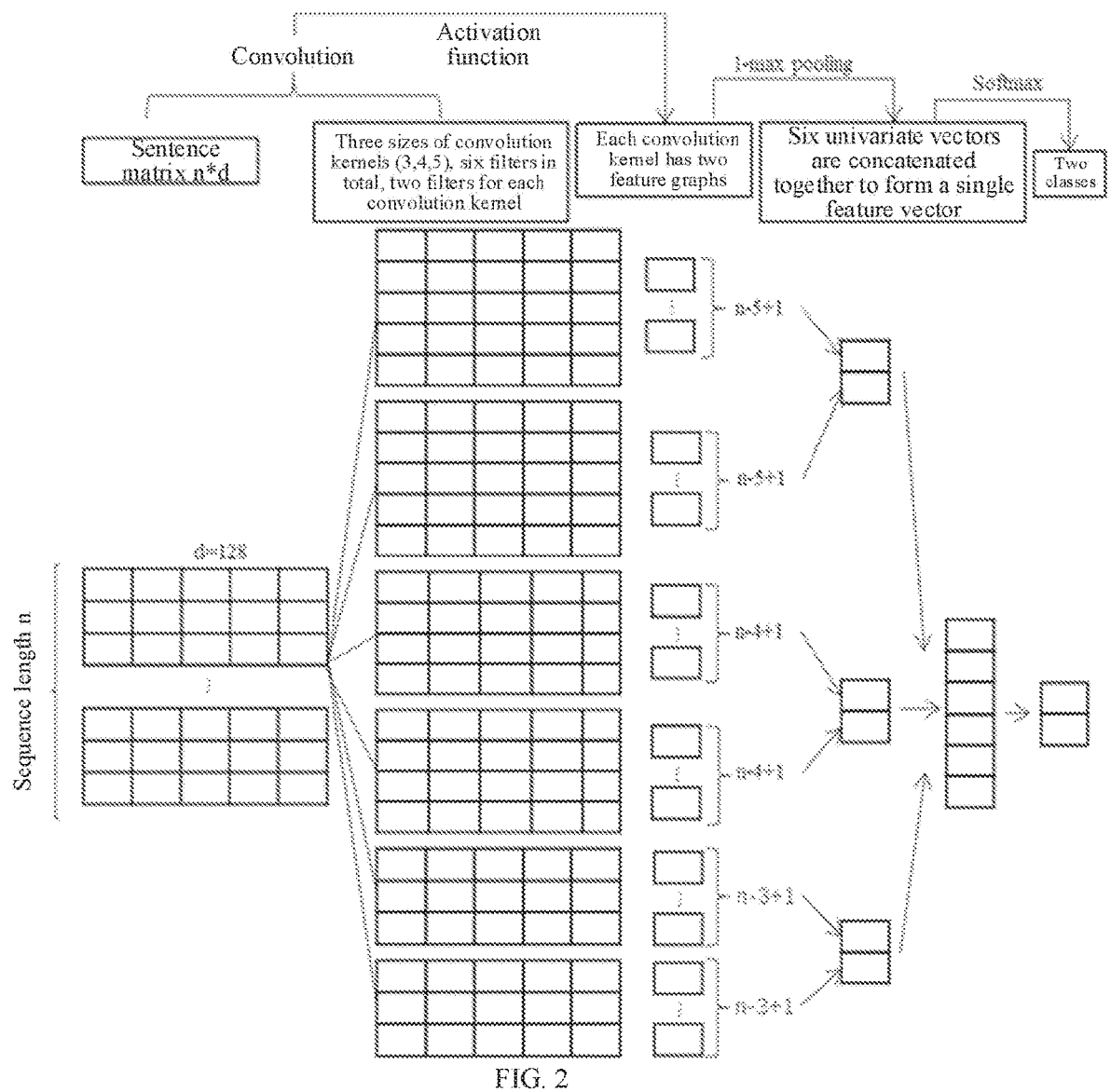
FIG. 2 is a flowchart of a text convolutional neural network (textCNN) according to a specific embodiment of the present disclosure.

(4.5) A text convolutional neural network (textCNN) is established, as shown in FIG. 2. The 880-dimensional new vector acquired in step (4.4) is taken as an input vector to detect a key sentence in an event and determine a key event. The textCNN is composed of four parts: an embedding layer, a convolutional layer, a pooling layer, and a fully connected layer. The embedding layer projects the input 880-dimensional vector into a low-dimensional space with a dimension of 128 through a hidden layer to help encode a semantic feature. The convolutional layer has three convolution kernels with sizes of 3, 4, and 5. The number of each type of convolution kernel is 128, and the convolution kernel has a width that is consistent with the dimension of the feature vector. By moving the convolution kernel down, a local correlation between words is extracted. The pooling layer represents the feature by extracting a maximum value of each feature vector. Each pooling value is spliced to generate a final feature vector, and finally, the fully connected layer determines whether the sentence includes a key event.

Figure 3:
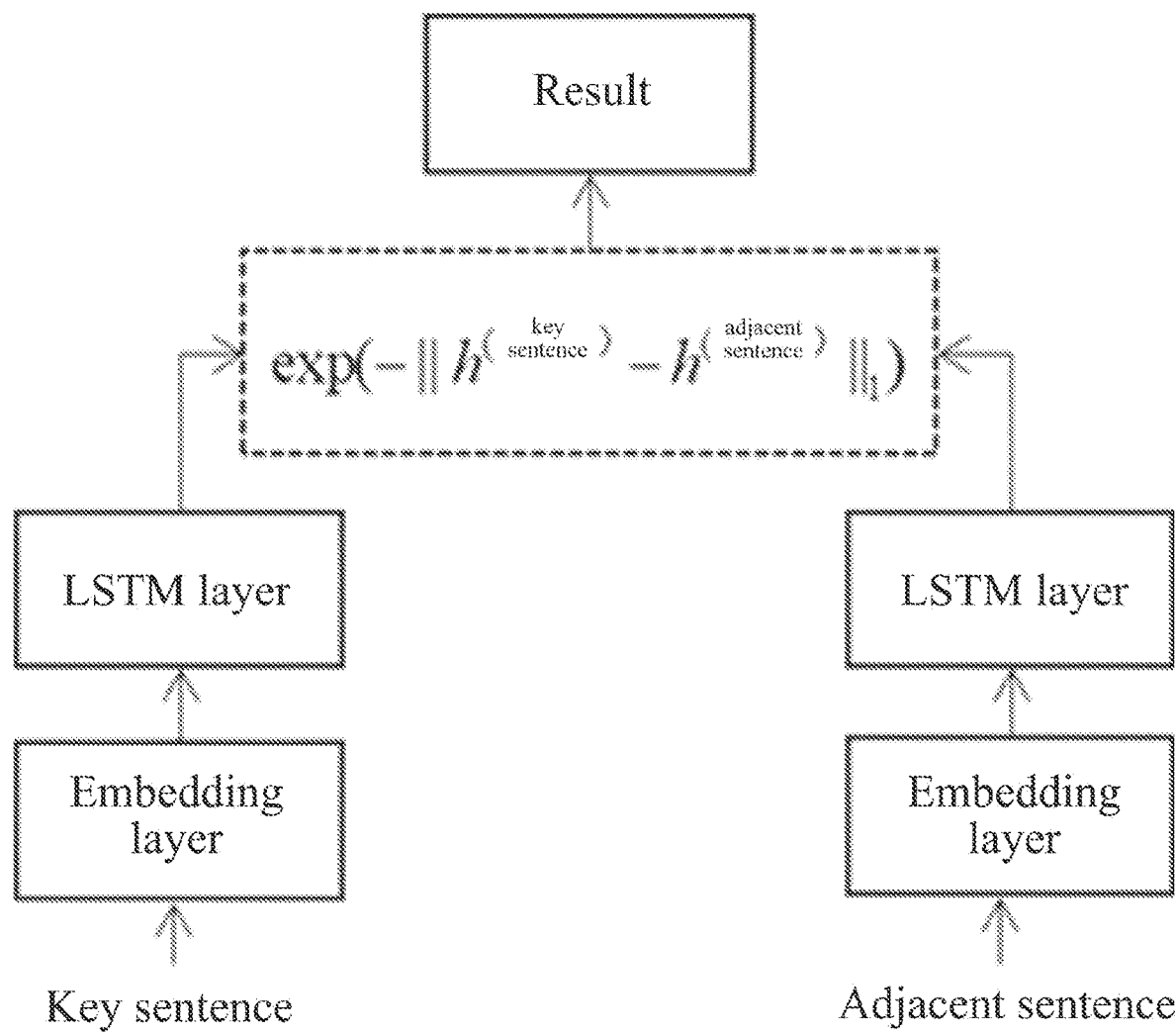
FIG. 3 is a flowchart of a twin neural network based on a Manhattan long short-term memory (LSTM) network according to a specific embodiment of the present disclosure.

(4.6) A <key sentence, adjacent sentence> pair is processed by the twin neural network based on a Manhattan LSTM network shown in FIG. 3 to represent the similarity in space and infer a potential semantic similarity of the sentences. The final hidden state in the convolutional network is taken as a vector representation of the two sentences, the similarity of the two sentences is measured by a Manhattan distance, and similarities between the key sentence and a surrounding sentence thereof are calculated and sorted from high to low according to the similarity. A corresponding missing argument is found and filled with an argument role in the adjacent sentence with the highest similarity.

To verify the validity of the model of the present disclosure, an experiment was carried out based on the dam emergency corpus. The case available in the corpus is shown in Table 1, and the event types and corresponding event arguments are shown in Table 2. The evaluation criteria used in the experiment are P, R, and $F_1$, where P denotes a precision rate, R denotes a recall rate, and $F_1$ is a comprehensive evaluation criterion for evaluating general classification problems. The event extraction models involved in the comparison experiment include a deep multi-pooling convolutional neural network (DMCNN) model, a convolutional bidirectional long short-term memory (C-BiLSTM) model, a joint recurrent neural network (JRNN) model, a hierarchical modular event argument extraction (HMEAE) model, and a joint multiple Chinese event extractor (JMCEE) model. The DMCNN model uses dynamic multi-pooling layers for event extraction based on event triggers and arguments. The C-BiLSTM model performs Chinese event extraction from the perspective of the character-level sequence labeling paradigm. The JRNN model performs event extraction through joint event extraction via a recurrent neural network. The HMEAE model designs a neural module network based on a concept level for each basic unit and forms a role-oriented module network through logical operations to classify specific argument roles. The JMCEE model jointly performs predictions on event triggers and event arguments based on a shared feature representation of a pre-trained language model.

TABLE 1

Dam dataset case

Case

On Aug. 13, 2018, an M5.0 earthquake occurred in Tonghai County, Yuxi City, Yunnan, with a focal depth of 7 kilometers, and the straight-line distance from the epicenter of the earthquake to the dam of the Manwan Hydropower Station is about 231 kilometers, so the Manwan production area was slightly shaken. In order to grasp the impact of the earthquake on the hydraulic structures of the Manwan Hydropower Station, the Manwan Hydropower Station carried out a comprehensive special inspection in a timely manner.

TABLE 2

Event types and corresponding event arguments in the dam dataset

| Event Type | Argument Role |
|---|---|
| Earthquake | Time, place, magnitude, focal depth, area of influence |
| Rainstorm | Start time, end time, place, rainfall, warning level |
| Flood discharge | Start time, end time, place, cause, monitoring means, monitoring effect |
| Pre-flood safety inspection | Start time, end time, place, cause, monitoring means |
| Comprehensive special inspection | Time, place, cause, monitoring means, monitoring effect |
| Daily maintenance | Start time, end time, place, maintenance location, level, measure, result analysis |
| Daily inspection | Time, place, inspection location, measure, result analysis |

Table 3 shows the comparison results between the model of the embodiment of the present disclosure and the five models DMCNN, C-BiLSTM, JRNN, HMEAE, and JMCEE. The results show that the model of the embodiment of the present disclosure makes full use of the syntactic relation and semantic structure and has a better event extraction effect based on the dam emergency corpus than the five models.

TABLE 3

Comparison of experimental results of different event extraction models

| Models | P | R | F1 |
|---|---|---|---|
| DMCNN | 57.64 | 54.37 | 55.96 |
| C-BiLSTM | 59.13 | 57.44 | 58.27 |
| JRNN | 60.84 | 56.95 | 58.83 |
| HMEAE | 62.49 | 54.81 | 58.40 |
| JMCEE | 65.37 | 57.86 | 61.39 |
| The present disclosure | 83.45 | 62.27 | 71.32 |

A system for extracting a dam emergency event based on a dual attention mechanism includes:

(1) a data preprocessing module configured for labeling a dam emergency corpus, and encoding sentences and a document with information on a dam emergency event;

(2) a dependency graph building module configured for introducing a dependency and building a dependency graph based on a sentence structure and a semantic structure to identify and classify all parameters of the dam emergency event;

(3) a dual attention network building module configured for generating a new dependency arc based on a GTAN, and aggregating node information to capture a long-range dependency and a potential interaction; and introducing an attention network, fusing features extracted by a GTAN layer and an attention network layer according to a set ratio, capturing key semantic information in the sentence, and extracting a sentence-level event argument; and (4) a document-level argument filling module configured for detecting a sentence with a key event in the dam emergency document and filling in an argument role with the highest similarity in a surrounding sentence to a key event missing part through a twin neural network.

The specific implementation of the system is the same as that of the method.

Obviously, a person skilled in the art should know that the steps or modules of the embodiments of the present disclosure may be implemented by a universal computing apparatus. These modules or steps may be concentrated on a single computing apparatus or distributed on a network consisting of a plurality of computing apparatuses and may optionally be implemented by programmable code that can be executed by the computing apparatuses. These modules or steps may be stored in a storage apparatus for execution by the computing apparatuses and may be implemented, in some cases, by performing the shown or described steps in sequences different from those described herein, or making the steps into integrated circuit modules respectively, or making multiple modules or steps therein into a single integrated circuit module. In this case, the embodiments of the present disclosure are not limited to any specific combination of hardware and software.

What is claimed is:

1. A method for extracting a dam emergency event based on a dual attention mechanism, comprising mining a syntactic relation based on a graph transformer attention network (GTAN) and an attention network and extracting and filling an event argument role based on a dam emergency corpus, the method executable by one or more processors of a computer device, the computer device comprising one or more memory and processors, wherein the method comprises the following steps:

(0) performing a special inspection and daily inspections on a dam and producing a special inspection report and daily inspection reports, wherein the dam emergency corpus includes the special inspection report and daily inspection reports;

(1) performing, by one or more of the one or more processors, a data preprocessing by labeling the dam emergency corpus and encoding sentences and a document with information on the dam emergency event;

(2) building, by one or more of the one or more processors, a dependency graph by introducing a dependency and building the dependency graph based on a sentence structure and a semantic structure to identify and classify all parameters of the dam emergency event;

(3) building, by one or more of the one or more processors, a dual attention network by generating a new dependency arc based on the GTAN, and aggregating node information to capture a long-range dependency and a potential interaction; and introducing the attention network, fusing features extracted by a GTAN layer and an attention network layer according to a set ratio, capturing key semantic information in the sentence, and extracting a sentence-level event argument; and (4) filling, by one or more of the one or more processors, a document-level argument by detecting a sentence with a key event in a dam emergency document and filling in an argument role with a highest similarity in a surrounding sentence to a key event missing part through a twin neural network.

2. The method for extracting the dam emergency event based on the dual attention mechanism according to claim 1, wherein in step (1), the step of performing the data preprocessing specifically comprises: labeling data of a special inspection report and a daily inspection report of a dam in a blocking I/O (BIO) mode; taking a 312-dimensional vector of a last layer of an ALBERT model as a word embedding vector, and concatenating an event type embedding vector, an entity type embedding vector, and a part-of-speech tag embedding vector; and mining the concatenated embedding vectors through a bidirectional long short-term memory (BiLSTM) network to acquire hidden vectors $H=h_1, \ldots, h_n$.

3. The method for extracting the dam emergency event based on the dual attention mechanism according to claim 1, wherein in step (2), the step of building the dependency graph specifically comprises: building an adjacency matrix $A^d$ of a dependency tree and a dependency label score matrix $\tilde{A}^{dl}$ according to a word relation in the dam emergency corpus; calculating a score between hidden vectors $h_i$ and $h_j$ acquired in step (1) to acquire a semantic score matrix $A^s$; and concatenating $A^d$, $\tilde{A}^{dl}$, and $A^s$ to acquire a dependency graph matrix $A=[A^d, \tilde{A}^{dl}, A^s]$.

4. The method for extracting the dam emergency event based on the dual attention mechanism according to claim 1, wherein in step (3), the step of building the dual attention network specifically comprises: proposing the GTAN, replacing a graph convolutional network (GCN) by a graph attention network (GAN), and performing a reasonable weight distribution; applying, by the GTAN, a 1×1 convolution to an adjacency matrix A set through a graph transformer layer, and generating a new meta-path graph through a matrix multiplication; applying, by a graph attention layer, the GAN to each channel of the meta-path graph $A^l$, and concatenating multiple node representations as a Z vector; calculating a weight matrix $\alpha_0$ of the attention network layer, multiplying $\alpha_a$ point by a hidden vector Ii to generate a vector $\tilde{H}$, and connecting, by a hyperparameter $\lambda$, the Z vector generated by the GTAN layer and the $\tilde{H}$ vector generated by the attention network layer to acquire a fused vector $\tilde{W}$:

$$\tilde{W}=\sigma(\lambda \cdot Z+(1-\lambda) \cdot \tilde{H})$$

wherein $\sigma$ is a sigmoid function.

5. The method for extracting the dam emergency event based on the dual attention mechanism according to claim 1, wherein in step (4), the step of filling the document-level argument specifically comprises: concatenating four embedding vectors of a special inspection report and a daily inspection report of a dam, namely, an argument label, an entity type, sentence information, and document information; building a text convolutional neural network (textCNN), taking the concatenated vectors as an input vector, detecting a key sentence regarding an event, and determining the key event; and calculating, by the twin neural network based on a Manhattan ISM network, a semantic similarity between the sentences, and filling the argument role.

6. The method for extracting the dam emergency event based on the dual attention mechanism according to claim 1, wherein a dam emergency refers to a working state of a dam in case of a natural disaster.

7. A computer device, comprising a memory, a processor, and a computer program stored in the memory and executable on the processor, wherein the processor executes the computer program to implement a method for extracting a dam emergency event based on a dual attention mechanism, comprising mining a syntactic relation based on a graph transformer attention network (GTAN) and an attention network and extracting and filling an event argument role based on a dam emergency corpus, the method comprising the following steps:
(1) performing a data preprocessing: labeling the dam emergency corpus and encoding sentences and a document with information on the dam emergency event;
(2) building a dependency graph: introducing a dependency and building the dependency graph based on a sentence structure and a semantic structure to identify and classify all parameters of the dam emergency event;
(3) building a dual attention network: generating a new dependency arc based on the GTAN and aggregating node information to capture a long-range dependency and a potential interaction; and introducing the attention network, fusing features extracted by a GTAN layer and an attention network layer according to a set ratio, capturing key semantic information in the sentence, and extracting a sentence-level event argument; and
(4) filling a document-level argument: detecting a sentence with a key event in a dam emergency document and filling in an argument role with a highest similarity in a surrounding sentence to a key event missing part through a twin neural network.

8. The computer device according to claim 7, wherein in the method, the dam emergency corpus comprises special inspection reports and daily inspection reports of a dam over the years.

9. The computer device according to claim 7, wherein in step (1) of the method, the step of performing the data preprocessing specifically comprises: labeling data of a special inspection report and a daily inspection report of a dam in a blocking I/O (BIO) mode; taking a 312-dimensional vector of a last layer of an ALBERT model as a word embedding vector, and concatenating an event type embedding vector, an entity type embedding vector, and a part-of-speech tag embedding vector; and mining the concatenated embedding vectors through a bidirectional long short-term memory (BiLSTM) network to acquire hidden vectors $H=h_1, \ldots, h_n$.

10. The computer device according to claim 7, wherein in step (2) of the method, the step of building the dependency graph specifically comprises: building an adjacency matrix $A^d$ of a dependency tree and a dependency label score matrix $\tilde{A}^{dl}$ according to a word relation in the dam emergency corpus; calculating a score between hidden vectors $h_i$ and $h_j$ acquired in step (1) to acquire a semantic score matrix $A^s$; and concatenating $A^d$, $\tilde{A}^{dl}$, and $A^s$ to acquire a dependency graph matrix $A=[A^d, \tilde{A}^{dl}, A^s]$.

11. The computer device according to claim 7, wherein in step (3) of the method, the step of building the dual attention network specifically comprises: proposing the GTAN, replacing a graph convolutional network (GCN) by a graph attention network (GAN), and performing a reasonable weight distribution; applying, by the GTAN, a 1×1 convolution to an adjacency matrix A set through a graph transformer layer, and generating a new meta-path graph $A^l$ through a matrix multiplication; applying, by a graph attention layer, the GAN to each channel of the meta-path graph $A^l$, and concatenating multiple node representations as a Z vector; calculating a weight matrix $\alpha_a$ of the attention network layer, multiplying a $\alpha_a$ point by a hidden vector H to generate a vector $\tilde{H}$, and connecting, by a hyperparameter $\lambda$, the Z vector generated by the GTAN layer and the $\tilde{H}$ vector generated by the attention network layer to acquire a fused vector $\tilde{W}$:

$$\tilde{W}=\sigma(\lambda \cdot Z+(1-\lambda)\cdot \tilde{H})$$

wherein $\sigma$ is a sigmoid function.

12. The computer device according to claim 7, wherein in step (4) of the method, the step of filling the document-level argument specifically comprises: concatenating four embedding vectors of a special inspection report and a daily inspection report of a dam, namely, an argument label, an entity type, sentence information, and document information; building a text convolutional neural network (textCNN), taking the concatenated vectors as an input vector, detecting a key sentence regarding an event, and determining the key event; and calculating, by the twin neural network based on a Manhattan LSTM network, a semantic similarity between the sentences, and filling the argument role.

13. The computer device according to claim 7, wherein in the method, a dam emergency refers to a working state of a dam in case of a natural disaster.

14. A non-transitory computer-readable storage medium, wherein the computer-readable storage medium stores a computer program for implementing a method for extracting, dam emergency event based on a dual attention mechanism, comprising mining a syntactic relation based on a graph transformer attention network (GTAN) and an attention network and extracting and filling an event argument role based on a dam emergency corpus, the method comprising the following steps:
(1) performing a data preprocessing: labeling the dam emergency corpus and encoding sentences and a document with information on the dam emergency event;
(2) building a dependency graph: introducing a dependency and building the dependency graph based on a sentence structure and a semantic structure to identify and classify all parameters of the dam emergency event;
(3) building a dual attention network: generating a new dependency arc based on the GTAN and aggregating node information to capture a long-range dependency and a potential interaction; and introducing the attention network, fusing features extracted by a GTAN layer and an attention network layer according to a set ratio, capturing key semantic information in the sentence, and extracting a sentence-level event argument; and
(4) filling a document-level argument: detecting a sentence with a key event in a dam emergency document and filling in an argument role with a highest similarity in a surrounding sentence to a key event missing part through a twin neural network.

15. The non-transitory computer-readable storage medium according to claim 14, wherein in the method, the dam emergency corpus comprises special inspection reports and daily inspection reports of a dam over the years.

16. The non-transitory computer-readable storage medium according to claim 14, wherein in step (1) of the method, the step of performing the data preprocessing specifically comprises: labeling data of a special inspection report and a daily inspection report of a dam in a blocking I/O (BIO) mode; taking a 312-dimensional vector of a last layer of an ALBERT model as a word embedding vector, and concatenating an event type embedding vector, an entity type embedding vector, and a part-of-speech tag embedding vector; and mining the concatenated embedding vectors through a bidirectional long short-term memory (BiLSTM) network to acquire hidden vectors $H=H_1, \ldots, H_n$.

17. The non-transitory computer-readable storage medium according to claim 14, wherein in step (2) of the method, the step of building the dependency graph specifically comprises: building an adjacency matrix $A^l$ of a dependency tree and a dependency label score matrix $\tilde{A}^{dl}$ according to a word relation in the dam emergency corpus; calculating a score between hidden vectors $h_i$ and $h_j$ acquired in step (1) to acquire a semantic score matrix $A^s$; and concatenating $A^l$, $\tilde{A}^{dl}$, and $A^s$ to acquire a dependency graph matrix $A=[A^d, \tilde{A}^{dl}, A^s]$.

18. The non-transitory computer-readable storage medium according to claim 14, wherein in step (3) of the method, the step of building the dual attention network specifically comprises: proposing the GTAN, replacing a graph convolutional network (GCN) by a graph attention network (GAN), and performing a reasonable weight distribution; applying, by the GTAN, a 1×1 convolution to an adjacency matrix A set through a graph transformer layer, and generating a new meta-path graph $A^l$ through a matrix multiplication; applying, by a graph attention layer, the GAN to each channel of the meta-path graph $A^l$, and concatenating multiple node representations as a Z vector; calculating a weight matrix $\alpha_a$ of the attention network layer, multiplying a $\alpha_a$ point by a hidden vector H to generate a vector $\tilde{H}$, and connecting, by a hyperparameter $\lambda$, the Z vector generated by the GAN layer and the $\tilde{H}$ vector generated by the attention network layer to acquire a fused vector $\tilde{W}$:

$$\tilde{W}=\sigma(\lambda \cdot Z+(1-\lambda) \cdot \tilde{H})$$

wherein $\sigma$ is a sigmoid function.

* * * * *